Figure 1:
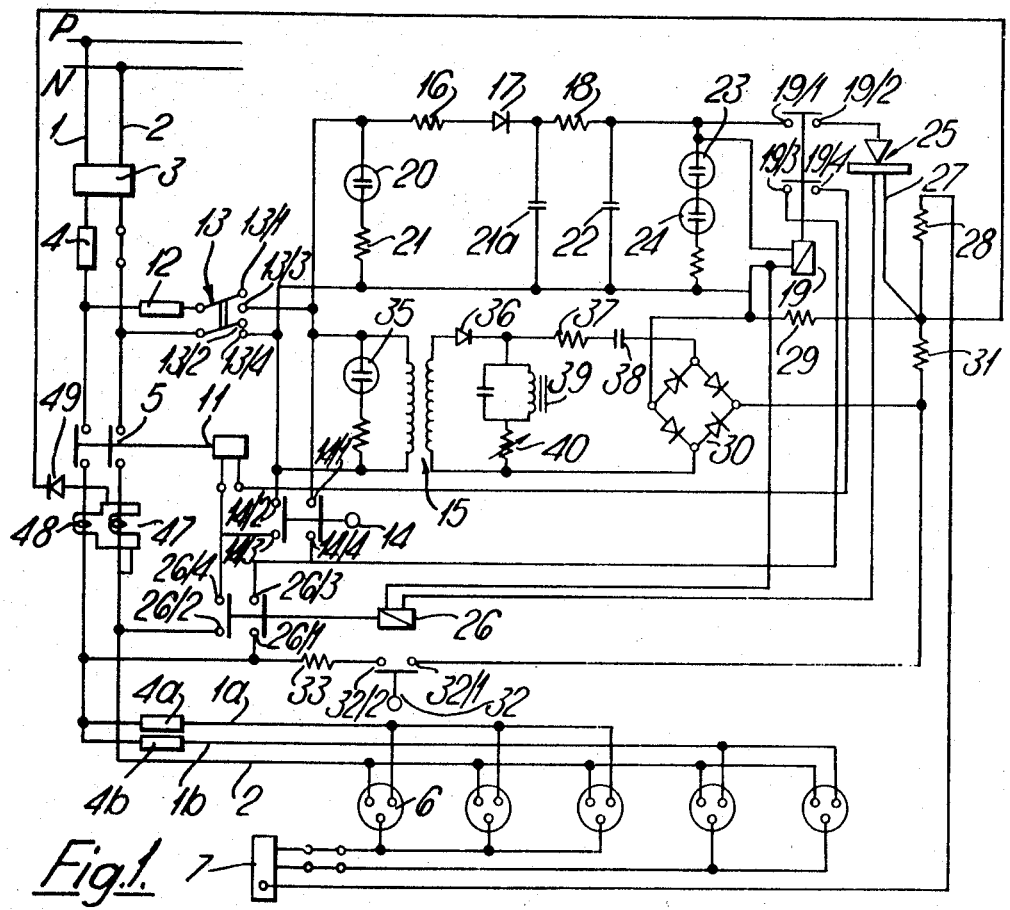

United States Patent

[11] 3,612,951

| [72] | Inventor | Leo Wajl<br>Tel Aviv, Israel |
|---|---|---|
| [21] | Appl. No. | 807,656 |
| [22] | Filed | Mar. 17, 1969 |
| [45] | Patented | Oct. 12, 1971 |
| [73] | Assignee | Samuel Cohen Johananoff<br>Monte Carlo, Monaco |
| [32] | Priority | Mar. 26, 1968 |
| [33] | | Israel |
| [31] | | 29,699 |

[54] SAFETY DEVICE FOR USE WITH ELECTRIC INSTALLATIONS
5 Claims, 3 Drawing Figs.

[52] U.S. Cl. ........................................ 317/18 D,
 317/51
[51] Int. Cl. ........................................ H02h 1/02
[50] Field of Search ........................................ 317/9, 18,
 151

[56] References Cited
UNITED STATES PATENTS

| 3,273,018 | 9/1966 | Goldberg | 321/45 DT |
| 2,114,687 | 4/1938 | Schmitt | 317/18 |
| 3,287,603 | 11/1966 | Sosnoski | 317/18 |
| 3,356,939 | 12/1967 | Stevenson | 324/51 |
| 3,402,326 | 9/1968 | Guasco et al. | 317/18 |
| 3,422,314 | 1/1969 | Legatti | 317/19 |

FOREIGN PATENTS

| 405,614 | 1/1934 | Great Britain | 317/18 D |

*Primary Examiner*—J. D. Miller
*Assistant Examiner*—Harry E. Moose, Jr.
*Attorney*—Arthur B. Colvin ABSTRACT: A safety device for use with an electric installation wherein an automatic circuit breaker is provided associated with a silicon controlled rectifier whose gate electrode is connected to one or more metallic parts of outer casings of appliances to be fed by the installation such that when a potential of predetermined magnitude appears on these metallic parts the silicon controlled rectifier conducts and results in the immediate opening of the circuit breaker.

Inventor
Leo WAJL
By Arthur B. Colvin
Attorney

SAFETY DEVICE FOR USE WITH ELECTRIC INSTALLATIONS

This invention relates to a safety device for use with electric installations adapted to be fed from a supply system and having one point earthed.

With many electric installations, means have always to be provided for ensuring that the appearance of an electric potential on any outer metal part of an appliance, fed by the installation, does not have dangerous consequences. In general, this objective is achieved by ensuring that all such exposed metal parts are either effectively earthed, or are protected by a safety device having in general, a connection to earth. The effectiveness of earthing in ensuring the safety of the installation and its associated appliances is, to a great extent, dependent on the nature of the earth and the connections thereto. Hitherto, it has been normal practice to employ as an earth, the metallic pipes of the water supply system. With the increasing use, however, of nonmetallic water pipes, the problem of securing an effective earth for the electric installation and its associated appliances has become more acute.

It is an object of the present invention to provide a new and improved safety device for use with an electric installation and associated appliances in which the above referred to difficulty is substantially avoided and overcome.

According to the present invention there is provided a safety device for use with an electric installation comprising an automatic circuit breaker, a capacitance adapted to be connected to the installation so as to be charged therefrom, a silicon controlled rectifier having a gate electrode adapted to be coupled to one or more metallic parts of outer casings of appliances to be fed by the installation and to be protected by the device, said capacitance being coupled to a relay actuating circuit via the silicon controlled rectifier, the arrangement being such that when a potential of predetermined magnitude appears at the gate electrode of the silicon controlled rectifier the latter conducts and the capacitor discharges through said relay actuating circuit leading to the opening of the circuit breaker.

With such a device there is entirely obviated the necessity of earthing the appliances seeing that as soon as any dangerous potential appears on the metallic casing or other external metallic part of the appliance the electric supply to the appliance is automatically cut off and cannot be restored until the defect has been removed.

In accordance with a preferred embodiment of the present invention the gate electrode is also coupled, via a transformer with the supply installation, the arrangement being such that upon any sudden variation of the supply voltage beyond a certain level or the disappearance of the supply voltage, a transient voltage impulse is transmitted to the gate electrode resulting in the actuation of the circuit breaker.

According to a modification of the present invention the circuit breaker is connected via the contacts of a relay with a circuit breaker actuating circuit, said relay being connected to a relay actuating circuit in parallel with a silicon controlled rectifier whose gate electrode is adapted to be coupled to one or more metallic parts of outer casings of appliances, the arrangement being such that when a potential of predetermined magnitude appears at the gate electrode of the silicon controlled rectifier the latter conducts and effectively short circuits said relay leading to the opening of the circuit breaker.

Figure 2:
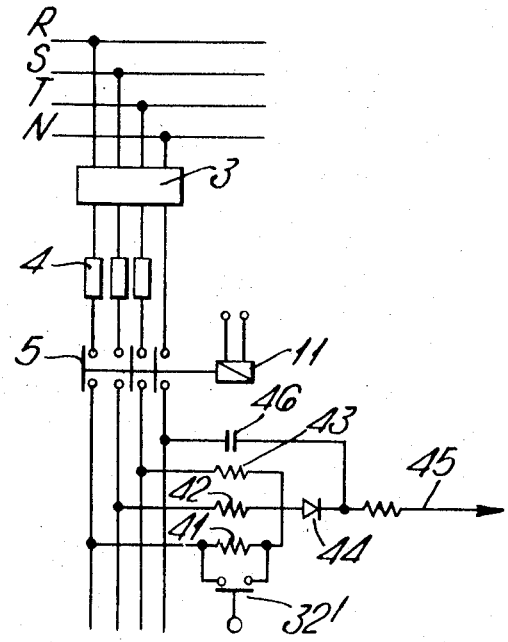
Figure 3:
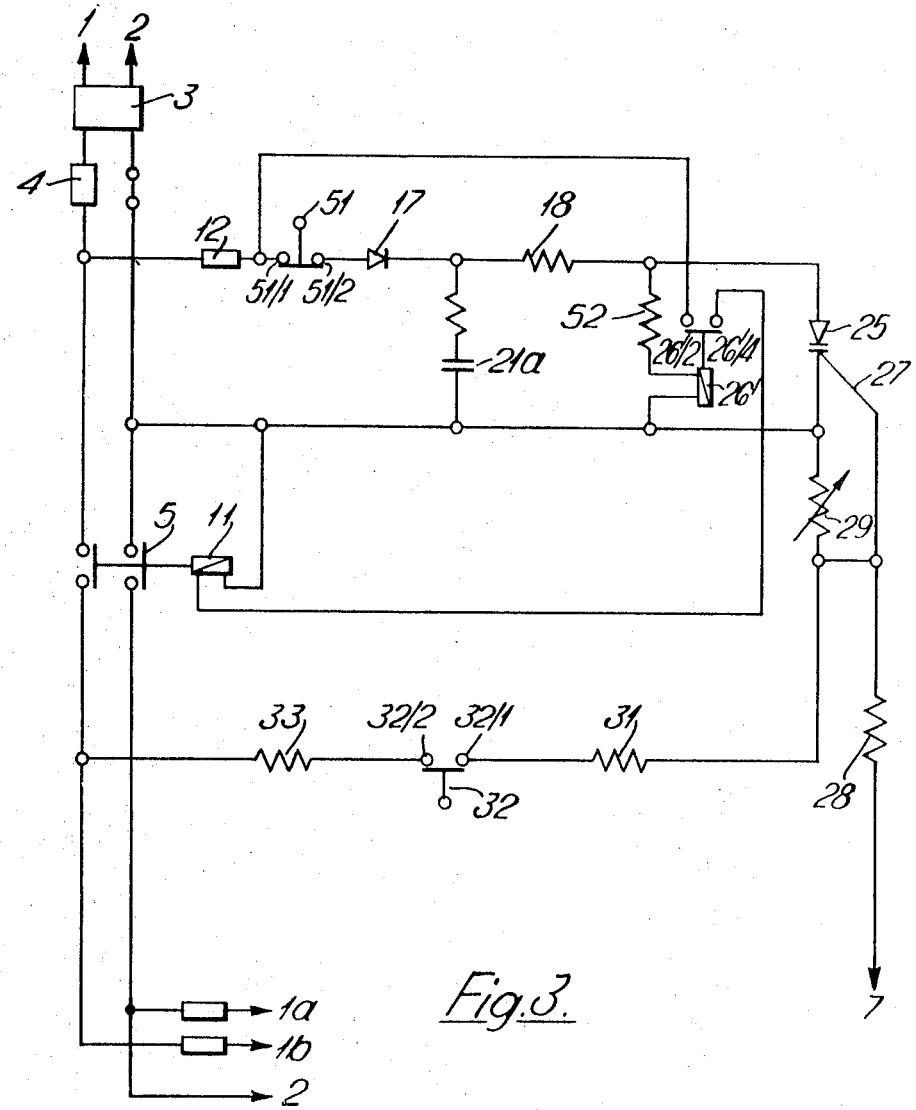

The invention will now be described by way of example and with reference to the accompanying drawings in which:

FIG. 1 is a schematic circuit diagram of a safety device in accordance with the present invention shown connected to a single phase supply system and to the external metallic casings of a plurality of appliances, FIG. 2 is a schematic circuit diagram showing the application and connection of the safety device to a three-phase supply system, and FIG. 3 is a schematic circuit diagram of part of a simplified form of the device as shown in FIG. 1.

As seen in FIG. 1 of the drawings a pair of single-phase electric supply lines, P and N have, branching off therefrom, conductors 1 and 2 to which is connected a consumer's meter 3. The conductor 1 is connected to a fuse 4 whilst the conductors 1 and 2 are connected to a relay operated automatic circuit breaker 5. The conductors 1 and 2 are designed to feed a plurality of plug-in appliances 6. For this purpose the conductor 1 branches off into a pair of branch conductors 1a and 1b, in which are respectively located safety fuses 4a and 4b. The metal casings of the appliances 6 are respectively connected to a terminal block 7.

The circuit breaker 5 is normally open and it is only upon actuation of a relay 11 that the circuit breaker closes.

The conductor 1 is connected at a point between the fuse 4 and the contact breaker 5, via a fuse 12 with a first moveable pole 13/1 of a double-pole switch 13. The conductor 2 is also connected at the same point with a second moveable pole 13/2 of the double-pole switch 13.

The first fixed pole 13/3 of the double-pole switch 13 is connected, on the one hand, to a fixed contact 14/1 of a pushbutton switch 14 and to one end of the primary winding of a transformer 15 and on the other hand via a resistor 16, diode 17, resistor 18 to a fixed contact 19/1 of a relay operated switch 19.

The second fixed pole 13/4 of the double-pole switch 13 is connected, on the one hand, to a fixed contact 14/2 of the pushbutton switch 14 and to the other end of the primary winding of the transformer 15, and on the other hand, to one input terminal of the relay 19, the other input terminal of which is connected to the contact 19/1. A first neon tube 20 is connected in series with a resistor 21 across the fixed terminals 13/3 and 1314. A capacitor 21a is connected between the junction of the diode 17 and resistor 18 and the fixed contact 13/4 whilst a capacitor 22 is connected between the fixed contact 19/1 and the fixed contact 13/4. A pair of series connected neon tubes 23 and 24 is connected in parallel with the capacitor 22. A fixed contact 19/2 is connected to one terminal of a silicon controlled rectifier 25, the other terminal of which is connected to one input terminal of a relay 26. The other input terminal of the relay 26 is connected to that input terminal of the relay 19 which in its turn is connected to the fixed contact 13/4.

A gate electrode 27 of the silicon controlled rectifier 25 is connected, via a resistor 28, to the terminal block 7, via a variable resistor 29 to one output terminal of a bridge network 30 and via a resistor 31, on the one hand, to the other output terminal of the bridge network 30 on the other hand to one fixed contact 32/1 of a pushbutton switch 32. The other contact 32/2 of the pushbutton switch 32 is connected, via a resistor 33, on the one hand to a fixed contact 26/1 of the relay 26 and on the other hand to the conductor 1 at a point between the circuit breaker 5 and the fuses 4a, 4b. A fixed contact 26/2 is connected to the conductor 2 at a point between the circuit breaker 5 and the appliances 6.

A fixed contact 26/4 is connected, on the one hand, to an input feed terminal of the relay 11 and on the other hand to a fixed contact 14/3 of the pushbutton switch 14, whilst a fixed contact 26/3 is connected, on the one hand, to a fixed contact 14/4 of the pushbutton switch 14 and on the other hand to a fixed contact 19/3 of the relay operated switch 19, the fixed contact 19/4 of this switch being connected to the other feed input terminal of the relay 11.

A neon tube 35 is connected across the primary winding of the transformer 15. One end of the secondary winding of this transformer is connected via a diode 36, resistor 37 and capacitor 38 to one input terminal of the bridge network 30, whilst the other end of the secondary winding of the transformer 15 is connected to the other input terminal of the bridge network 30. Connected across the secondary winding is a capacitor-choke network 39 in series with a variable resistor 40.

A pair of coils, 47 and 48, are inductively coupled respectively to the conductors 1 and 2 in a position between the circuit breaker 5 and the appliances 6. The coils 47 and 48 are connected together and on the one hand connected to the conductor 2 and on the other hand via a diode 49 to the gate electrode 27 of the silicon controlled rectifier 25.

The operation of the device, in affording protection against breakdown of insulation of one or more of the metallic casings of the appliances 6 or against the failure of a phase or neutral will now be described.

When it is desired to put the device in circuit the switch 13 is closed and remains closed, the contacts of the relay 26 being normally closed whilst the remaining contacts shown in the figure being normally open. Directly upon closing the switch 13 the tubes 20 and 35 light-up and the capacitor 22 becomes fully charged after a predetermined delay, (the charging voltage having been rectified) and it is only after this delay that the relay 19 is actuated and its contacts close. This delay is therefore effective in insuring that the subsequent connection of the appliances cannot be effected before the safety device is connected in circuit.

The pushbutton 14 can now be depressed, closing the contact pairs 14/1, 14/4 and 14/2, 14/3. As a consequence the relay 11 is actuated receiving its feed supply on the one hand through the contact pairs, 14/2 14/3 and 13/4, 13/2 and, on the other hand through the contact pairs 19/4, 19/3, 14/4, 14/1 and 13/3, 13/1. With the actuation of the relay 11 the relay controlled circuit breaker 5 is closed thereby putting the appliances 6 in circuit. It will be realized that with the release of the pushbutton 14 the relay 11 still remains actuated and the circuit breaker 5 remains closed, seeing that under these circumstances the relay receives its supply voltage, on the one hand through the normally closed contacts 26/4, 26/2 and on the other hand through the closed contacts 19/4, 19/3 and normally closed contacts 26/3, 26/1.

If now, as a result of the breakdown of insulation or the like, a potential appears on the metallic casing of one or more appliances 6, this potential will in consequence be fed from the terminal block 7 and via the resistance 28 to the gate electrode 27 of the silicon controlled rectifier 25. Provided this potential is above a certain magnitude, the appearance of this potential on the gate electrode 27 will cause the silicon rectifier 25 to become conductive. As a result actuating current will thereupon flow through the relay 26 causing the opening of the normally closed contacts thereof and resulting in the deactuation of the relay 11 and the opening of the circuit breaker 5 and the consequent disconnection of the appliances 6 from the mains. Furthermore the fact that the capacitor 22 has discharged, means that the relay 19 is deactuated, its contacts open and the current flow through the silicon controlled rectifier 25 interrupted, thereby resetting the safety device. Any attempt to reconnect the appliances 6 to the mains by depression of the pushbutton 14 will fail as long as the defect which caused the original actuation of the device persists, seeing that any such attempt will merely result in the silicon controlled rectifier 25 becoming conductive again.

If there should occur a variation in the supply voltage beyond certain predetermined limits (for example ± 20 percent), or, alternatively the supply voltage be entirely cut off by either of the conductors 1 or 2 being broken, then a transient voltage impulse will be developed as a result of the sudden variation or disappearance of the voltage. This impulse is passed from the secondary winding of the transformer 15 via the rectifier 36, resistor 37 and capacitor 38 to the bridge network 30 which is instrumental in ensuring that the output thereof is always of the same sign irrespective of the sense of the variation of the voltage. As a consequence a potential is applied to the gate 27 of the silicon controlled rectifier 25 via the resistor 31, and, providing this potential is of sufficient magnitude, the silicon controlled rectifier 25 conducts, the capacitor 22 discharges, the relay 26 is actuated and in a manner similar to that described above, the circuit breaker 5 opens thereby disconnecting the appliances 6 from the voltage source.

The provision of the neon tubes 20 and 35 when ignited gives a direct indication that a supply voltage exists. On the other hand the provision of the neon tubes 23 and 24 provides an indication that the capacitor 22 is charged, in which case these tubes are ignited. The provision of more than one series connected neon tube ensures that the device operates only when a certain minimum voltage level is reached and prevents self discharge of the capacitor 22.

The pushbutton switch 32 is provided to give an opportunity for ascertaining whether the device operates correctly. Thus, this pushbutton switch 32 is normally open. When, however, for the purposes of testing, the pushbutton switch 32 is depressed, a potential will appear on the gate electrode 27 causing the silicon controlled rectifier to conduct with circuit breaking effect as described above. If, upon depression of the pushbutton switch 32, the neon tubes 23, 24 are extinguished then the device can be assumed to be operating correctly.

The device, as just described, operates as indicated as long as the appliances 6 are all correctly connected to the terminal block 7 and the latter is duly connected via the resistor 28 to the gate electrode 27 of the silicon controlled rectifier 25. For the eventuality that one or other of these connections is defective or absent there are provided the coils 47 and 48. These coils are so coupled that as long as there is no difference in current flow in the conductors 1 and 2 the currents flowing through the coils 47 and 48 being equal, cancel each other out and no current flows through the diode 49. When, however, a difference in current flow, for example, of the order of 30 ma. arises in the conductors 1 and 2, as a result of leakage or any other reason, a resultant flow of current will take place through the coils 47 and 48 and through the diode 49 to the gate electrode 27 so as to render the silicon controlled rectifier 25 conductive and open the circuit breaker 5. This will occur whether the appliances 6 are duly coupled to the block 7 and the latter to the gate electrode or not.

In the embodiments specifically described above the device has been shown connected in a single phase installation. It will be appreciated that the device can equally well be connected in multiphase installation. FIG. 2 shows schematically how the connection of the device in a three phase installation can be effected. In this case the circuit of the safety device is substantially identical with the circuit as shown in FIG. 1 with the exception, of course, that the circuit breaker 5, which is now employed is capable of interrupting current flow in all four conductors. Additionally the test pushbutton switch 32' which, as has been previously explained is designed to be used for ascertaining that the device is in correct working order, is now connected across a resistor 41 which resistor is connected at one end to the corresponding ends of resistors 42 and 43, the other corresponding ends of the resistors 41, 42 and 43 being respectively connected to the three phase conductors. The common ends of the resistors 41, 42 and 43 are connected via a diode 44 and a resistor 45 to the gate 27 electrode of the silicon controlled rectifier. A capacitor 46 is connected between the neutral conductor and the junction between the diode.

As in the embodiment shown in FIG. 1, in the embodiment shown in FIG. 2, the four conductors can be inductively coupled with four coils, these coils being so coupled together, and via a diode to the gate electrode that any difference in the currents flowing through the conductors causes a resultant flow of current through the coils via the diode to the gate electrode so as to render the silicon controlled rectifier conductive and thereby open the circuit breaker. Upon depression of the test pushbutton switch 32', the resistance 41 is short circuited and this causes an imbalance in the circuits including the resistances 41, 42, and 43. In consequence a potential appears on the gate electrode of the silicon controlled rectifier with the consequent opening of the circuit breaker 5'. Similarly the disappearance of one or more phases causes a similar imbalance in the circuits including the resistances referred to above with a consequent conduction through the silicon controlled rectifier 23 and opening of the circuit breaker 5'.

It will be understood that the provision of a safety device in accordance with the present invention is completely effective in protecting consumers against the possibly dangerous or fatal effects consequent upon defective or breakdown in insulation of appliances and the consequence appearance of a potential on the metallic casings of these appliances. This is achieved without the necessity of earthing the appliances. Furthermore the device provides effective protection for the appliances in the event of a variation in the supply voltage beyond specified limits or in the event of a failure of one or more phases of the supply or of the neutral. Such failure can result from an intentional interruption or from a blown fuse or the like. Similarly the device ensures that the appliances are only connected in circuit when the supply voltage has reached a predetermined magnitude.

In view of the fact that the actuation of the circuit breaker depends upon the discharge of a preliminarily loaded capacitance it will be appreciated that the circuit breaker is provided with its own voltage source (the charged capacitance) and its activation is independent dependent of any external supply source.

Whilst in the embodiments described above the device is at one and the same time effective in providing protection against the consequences of:

a. defective insulation of appliances or,
b. a variation in the supply voltage beyond specified limits or,
c. the failure of one or more phases of the supply of the neutral or,
d. the failure in the connection of one or more of the appliances to the terminal block or of the terminal block to the gate of the silicon controlled rectifier, a device, in accordance with the present invention, can be designed which need only provide protection against defective insulation and, if desired, possible additional protection against one or more of the additional factors just listed.

Whilst in the embodiments described above, relay 26, being normally closed, is connected in series with the silicon controlled rectifier 25, in the simplified modification of the device shown in FIG. 3 the relay 26' is normally open and is connected in parallel with the silicon controlled rectifier 25. Those elements of the simplified device which are identical with the elements shown in FIG. 1 will be identified by the same reference numerals whilst only those elements which are essential to a proper understanding of the modification will be shown in detail. The coupling of the device shown in FIG. 3 to the supply circuit and to the appliances is indicated by arrows.

In this modification the actuating coil of a normally open relay 26' is connected in circuit with the conductors 1 and 2 via the fuse 12, fixed contacts of a normally closed reset pushbutton button switch 51, diode 17, resistor 18 and resistor 52, the smoothing capacitor 21a being connected in parallel with the actuating coil of relay 26' and the resistor 52. In contrast to the relay 26 in the embodiments described above with reference to FIGS. 1 and 2 of the drawings, the relay 26' in this embodiment can be also single pole and fixed contacts (e.g. 26'/2 and 26'/4) thereof are connected in circuit with the actuating coil 11 of the automatic circuit breaker 5. Upon connection (as shown) to the supply circuit 1, 2 the actuating coil of the relay 26' will be actuated and in consequence the contacts 26'/2 and 26'/4 will be closed and actuating current will flow through the actuating coil 11 of the circuit breaker 5 causing the closing of the circuit breaker 5. If now, as a consequence of defective insulation a sufficient potential appears at 7 and is transmitted, via the resistor 28 to the gate electrode 27 of the silicon controlled rectifier 25, the latter will begin to conduct and will, in consequence, short circuit the winding of the relay 26' which will be deactuated. As a consequence the contacts 26'/2 and 26'/4 will open and actuating current will cease to flow through the winding 11 of the circuit breaker 5 which will thereupon open. On the other hand current will continue to flow through the silicon controlled rectifier 25 seeing that this is connected to the supply circuit upstream of the circuit breaker 5. If now it is desired to reset the circuit the reset pushbutton switch 51 is depressed thereby breaking the supply to the silicon controlled rectifier 25. When the reset pushbutton 51 is released, and provided that the equipment with the defective insulation has been repaired, replaced or disconnected, actuating current will again flow through the winding of the relay 26' and the circuit breaker 5 will again be closed. If on the other hand the defective insulation is still present the silicon controlled rectifier 25 will again conduct leading to the opening of the circuit breaker 5.

Thus, the device just described constitutes a modified simplification of the devices previously described and is effective in causing immediate breaking of the supply circuit when defective insulation appears at any of the appliances connected thereto.

I claim:

1. A safety device for use with an electric installation comprising a circuit breaker, a circuit breaker actuating circuit, a safety circuit responsively connected to the circuit breaker actuating circuit, coupling means for coupling the safety circuit to the installation upstream of the circuit breaker, a relay included in the safety circuit and having contacts included in the actuating circuit, a silicon controlled rectifier connected in the safety circuit via said contacts, and having a gate electrode adapted to be coupled to a metallic part of an outer casing of an appliance to be fed by the installation to be protected by the device and a capacitance connected across said relay, the arrangement being such that when a potential of predetermined magnitude appears at the gate electrode of the silicon controlled rectifier the latter conducts so that on the one hand the relay contacts change over as a result of which the circuit breaker opens, and on the other hand said capacitance discharges for the consequent opening of said contacts.

2. A safety device according to claim 1, wherein said relay having normally closed contacts is connected in series with a further relay having normally open contacts which are connected in said actuating circuit.

3. A safety device according to claim 2 wherein said normally open contacts are connected in parallel with a pushbutton switch.

4. A safety device according to claim 1, wherein there is furthermore provided a transient voltage impulse circuit comprising a transformer, the secondary winding of which is coupled to said gate electrode via a bridge network adapted to transform all transient impulses to the same direction.

5. A safety device according to claim 1, wherein a plurality of coils are inductively coupled to a like plurality of conductors which serve to connect said circuit breaker with said appliances, said coils being so coupled together and via a diode to the gate electrode that any difference in the currents flowing through the conductors causes a resultant flow of current through the coils and passes via said diode to said gate electrode so as to render the silicon controlled rectifier conductive and thereby open the circuit breaker.

UNITED STATES PATENT OFFICE
CERTIFICATE OF CORRECTION

Patent No. 3,612,951          Dated   October 12, 1971

Inventor(s)   Leo Wajl

It is certified that error appears in the above-identified patent and that said Letters Patent are hereby corrected as shown below:

On the cover sheet [73] "Samuel Cohen Johananoff" should read -- a part interest to Samuel Cohen Johananoff --.

Signed and sealed this 20th day of June 1972.

(SEAL)
Attest:

EDWARD M. FLETCHER, JR.
Attesting Officer

ROBERT GOTTSCHALK
Commissioner of Patents